United States Patent
Callas et al.

(10) Patent No.: US 6,553,763 B1
(45) Date of Patent: Apr. 29, 2003

(54) TURBOCHARGER INCLUDING A DISK TO REDUCE SCALLOPING INEFFICIENCIES

(75) Inventors: James J. Callas, Peoria, IL (US); Frank G. Gerke, Chillicothe, IL (US); Delbert L. Kramer, Metamora, IL (US); Mark D. Moeckel, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/943,230

(22) Filed: Aug. 30, 2001

(51) Int. Cl.⁷ .................................................. F02B 33/44
(52) U.S. Cl. .................. 60/605.2; 416/185; 416/244 A; 416/241 R; 415/184
(58) Field of Search .................. 416/244 A, 204 A, 416/213 R, 185, 241 R; 60/605.2; 415/171.1

(56) References Cited

U.S. PATENT DOCUMENTS

| | | | | |
|---|---|---|---|---|
| 2,941,780 A | * | 6/1960 | Nuell et al. ................... | 416/182 |
| 3,077,297 A | * | 2/1963 | Clarke ........................ | 416/244 A |
| 4,179,892 A | * | 12/1979 | Heydrich .................... | 60/605.2 |
| 4,188,169 A | * | 2/1980 | Mowill ........................ | 416/185 |
| 4,335,997 A | * | 6/1982 | Ewing et al. ................ | 416/185 |
| 4,385,866 A | * | 5/1983 | Ochiai et al. ................ | 416/185 |
| 4,659,288 A | * | 4/1987 | Clark et al. ................. | 416/244 A |
| 4,664,598 A | * | 5/1987 | Milfs et al. .................. | 416/185 |
| 4,907,947 A | * | 3/1990 | Hoppin, III ................. | 416/244 A |
| 5,061,154 A | * | 10/1991 | Kington ...................... | 416/241 R |
| 5,344,163 A | * | 9/1994 | Roll et al. ................... | 415/171.1 |
| 5,443,362 A | * | 8/1995 | Crites et al. ................. | 415/184 |
| 5,802,846 A | | 9/1998 | Bailey ......................... | 60/605.2 |
| 6,230,682 B1 | * | 5/2001 | Gustafsson et al. .......... | 60/605.2 |

FOREIGN PATENT DOCUMENTS

JP          410131704 A    *   5/1998

* cited by examiner

Primary Examiner—Thomas Denion
Assistant Examiner—Thai-Ba Trieu
(74) Attorney, Agent, or Firm—Todd T. Taylor

(57) ABSTRACT

A turbocharger for an internal combustion engine is provided with a compressor having an inlet receiving combustion gas and an outlet; and a turbine drivingly coupled to the compressor. The turbine has a shaft and a turbine wheel disposed on the shaft. The turbine wheel has a plurality of turbine blades and an edge defining a plurality of scallops. Scallop fillers are disposed between the turbine blades. Advantages of a scalloped turbine wheel, resulting from reductions in mass, are achieved without reductions in efficiency normally experienced with scalloped turbine wheels.

17 Claims, 2 Drawing Sheets

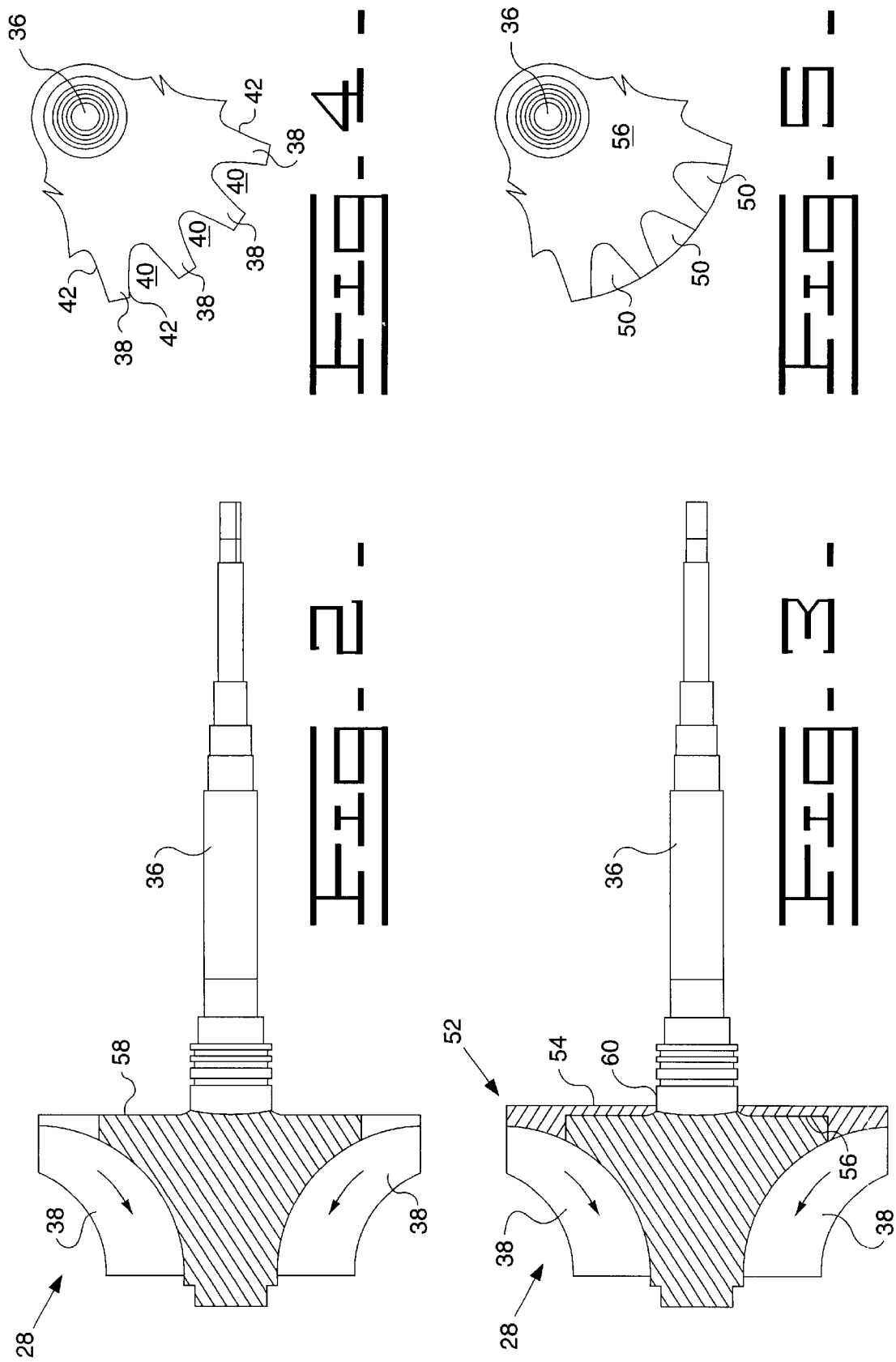

TURBOCHARGER INCLUDING A DISK TO REDUCE SCALLOPING INEFFICIENCIES

TECHNICAL FIELD

The present invention relates turbochargers for internal combustion engines, and, more particularly, to a turbocharger turbine having a scalloped turbine wheel.

BACKGROUND

A limiting factor in the performance of an internal combustion engine is the amount of combustion air that can be delivered to the intake manifold for combustion in the engine cylinders. Atmospheric pressure is often inadequate to supply the required amount of air for proper operation of an engine at high efficiency. Therefore, it is common practice to use an auxiliary system to supply additional air to the intake manifold.

An internal combustion engine may include one or more turbochargers for compressing air that is then supplied to the combustion cylinders. Each turbocharger typically includes a turbine driven by exhaust gases of the engine, and at least one compressor driven by the turbine. The compressor receives air to be compressed, and supplies the compressed air to the combustion cylinders. The turbocharger supplies combustion air to the engine at a higher pressure and higher density than atmospheric pressure and ambient density. The turbocharger can be used to make up for a loss of power due to altitude, or to increase the power that can be obtained from an engine of a given displacement. thereby reducing the cost, weight and size of an engine for a given power output.

It is also common to use exhaust gas recirculation systems (EGR systems) for controlling the generation of undesirable pollutant gases and particulate matter in the operation of an internal combustion engine. EGR systems have proven particularly useful for on the road motor equipment. In a typical EGR system, exhaust gas byproducts are recirculated to the intake air supply of the internal combustion engine. The result is a decrease in the concentration of oxygen, which in turn lowers the maximum combustion temperature within the cylinder, and slows the chemical reaction of the combustion process, thereby decreasing the formation of nitrous oxides (NOx). Unburned hydrocarbons in the exhaust gases can be burned on reintroduction to the engine cylinder, further reducing the emission of exhaust gas byproducts.

When utilizing EGR in a turbocharged diesel engine, the exhaust gas to be recirculated is normally removed upstream of the exhaust gas driven turbine associated with the turbocharger. In many applications, the exhaust gas is diverted directly from the exhaust manifold. In a divided exhaust manifold system, an EGR system may be designed to take exhaust gas from both sides of the divided manifold system, or from only one side of the divided manifold system. Using either approach decreases the exhaust flow available to operate the turbine of the turbocharger. An example of an internal combustion engine having an exhaust gas turbocharger and an EGR system is disclosed in U.S. Pat. No. 5,802,846 (Bailey).

To reduce stresses in a turbocharger turbine wheel to an acceptable level, it is known to remove some of the material in the turbine wheel, thereby reducing the rotating mass. One practice has been to remove material near the outer diameter of the turbine wheel, between the turbine blades. This practice is referred to as "scalloping", as the outer edge of the turbine wheel will have a scalloped appearance. While the practice of scalloping has advantages in reducing turbine wheel stresses, turbine performance is reduced in that the scalloped wheel disrupts the smooth flow of exhaust gas through the turbine. In an engine having significant EGR flow, it is desirable to maintain turbine efficiency at a high level, to take advantage of the decreased exhaust gas flow available to the turbocharger, and thereby provide sufficient compressed air flow to the engine for combustion. The decrease in efficiency from the use of a scalloped turbine wheel may offset the advantages obtained from scalloping, particularly in an engine having significant EGR flow.

The present invention is directed to overcoming one or more of the problems as set forth above.

SUMMARY OF THE INVENTION

In one aspect of the invention, an internal combustion engine is provided with a plurality of combustion cylinders, an exhaust manifold, an intake manifold and a turbocharger. The turbocharger includes a compressor having an inlet receiving combustion gas and an outlet in fluid flow communication with the intake manifold, and a turbine drivingly coupled to the compressor. The turbine has a turbine casing, a shaft rotatably disposed in the casing, and a turbine wheel disposed on the shaft in the casing. The turbine wheel has a plurality of turbine blades and an edge defining a plurality of scallops. Scallop fillers are disposed between the turbine blades.

In another aspect of the invention, a turbocharger is provided with a compressor having an inlet receiving combustion gas and an outlet; and a turbine drivingly coupled to the compressor. The turbine has a shaft and a turbine wheel disposed on the shaft. The turbine wheel has a plurality of turbine blades and an edge defining a plurality of scallops. Scallop fillers are disposed between the turbine blades.

In yet another aspect of the invention, a turbine is provided with a turbine casing, a shaft rotatably disposed in the casing and a turbine wheel disposed on the shaft. The turbine wheel has a plurality of turbine blades and an edge defining a plurality of scallops. Scallop fillers are disposed between the turbine blades.

In still another aspect of the invention, a method of operating an internal combustion engine, is provided, with steps of providing a plurality of combustion cylinders, an exhaust manifold and an intake manifold; transporting exhaust gas from the plurality of combustion cylinders to the exhaust manifold; providing a turbocharger including a compressor having an inlet and an outlet, and a turbine having an inlet and an outlet, a turbine wheel, a plurality of turbine blades and scallops on an outer edge of the turbine wheel; providing scallop fillers plugging the scallops; rotatably driving the turbine with exhaust gas introduced at the turbine inlet, flowing the exhaust gas along the turbine wheel and the scallop fillers to the turbine outlet; introducing combustion gas at the compressor inlet; and transporting combustion gas from the compressor outlet to the intake manifold.

In a further aspect of the invention, a turbine is provided with a turbine casing, a shaft rotatably disposed in the casing and a turbine wheel disposed on the shaft. The turbine wheel has a plurality of turbine blades and an outer edge. A means is provided, separate from and associated with the turbine wheel, for improving the aerodynamic efficiency of fluid flow along the turbine blades.

BRIEF DESCRIPTION OF THE DRAWINGS

FIG. 2 is a cross-sectional view of a scalloped turbine wheel;

FIG. 3 is a cross-sectional view of turbine wheel and shaft incorporating the present invention;

FIG. 4 is a fragmentary plan view of a scalloped turbine wheel; and

FIG. 5 is a fragmentary plan view of a disk embodying the present invention.

DETAILED DESCRIPTION

Figure 1:
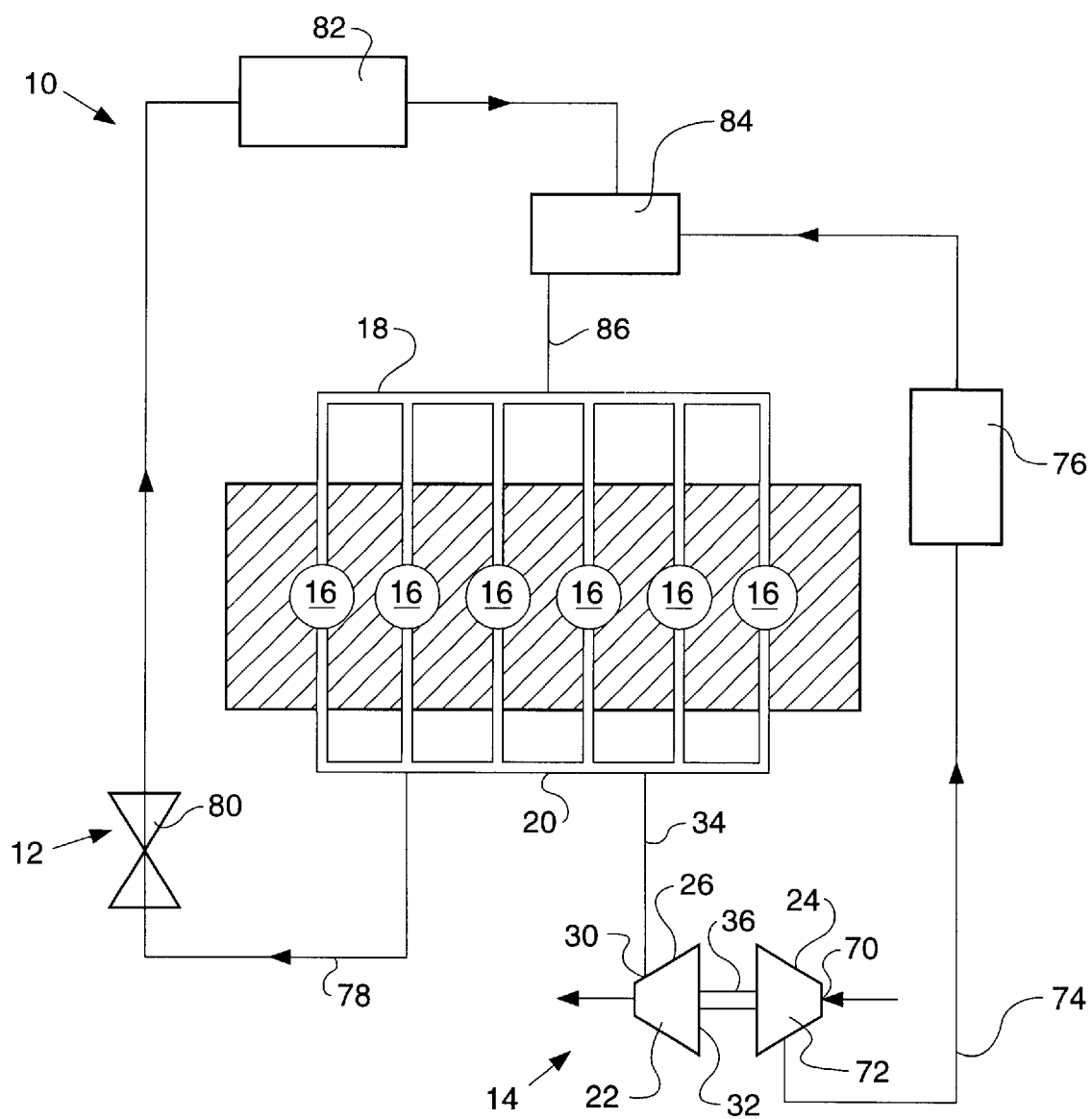
FIG. 1 is a schematic representation of an internal combustion engine having a turbocharger incorporating the present invention.

Referring now to the drawings, and to FIG. 1 in particular, an internal combustion engine 10 is shown having an exhaust gas recirculation (EGR) system 12, and a turbocharger 14 in which the present invention may be used advantageously.

Internal combustion engine 10 includes a plurality of combustion cylinders 16, and as shown in FIG. 1, includes six combustion cylinders 16. Each combustion cylinder 16 is coupled with an intake manifold 18 and with an exhaust manifold 20. While a single intake manifold 18 is shown, it should be understood that more than one intake manifold may be used with or coupled to each combustion cylinder 16, for providing an air mixture to each combustion cylinder 16. Further, while a single exhaust manifold 20 is shown, it should be understood that more than one exhaust manifold could be provided, with each exhaust manifold coupled to a different plurality of combustion cylinders 16. Additionally, while a single turbocharger 14 is shown, it should be understood that two or more turbochargers may be used, and the present invention may be incorporated into one or more of the turbochargers. A fuel, such as diesel fuel is introduced into each combustion cylinder and combusted therein, in a known manner.

Turbocharger 14 includes a turbine 22 and a compressor 24. Turbine 22 includes a turbine casing 26 having a turbine wheel 28 operatively disposed for rotation therein. Turbine casing 26 defines a turbine inlet 30 and a turbine outlet 32. Turbine inlet 30 is connected in flow communication with exhaust manifold 20 via a fluid conduit 34. Turbine outlet 32 is connected to a further exhaust system (not shown) of engine 10, which may include one or more mufflers, with subsequent discharge to an ambient environment.

Turbine wheel 28 (FIGS. 2 & 3) is disposed on a shaft 36 drivingly coupled to a compressor wheel (not shown) in compressor 24. Turbine wheel 28 includes a plurality of turbine blades 38. To reduce the mass of turbine wheel 28, some of the material of turbine wheel 28 has been removed between adjacent turbine blades 38, forming a plurality of scallops 40 (FIG. 4) extending inwardly from the outer diameter of turbine wheel 28. Thus, as seen most clearly in FIG. 4, the outer edge 42 of turbine wheel 28 has a serpentine configuration, defining scallops 40 between the radially outer tips of turbine blades 38.

A plurality of scallop fillers 50 are provided, one such scallop filler 50 for each scallop 40. Scallop fillers 50 may be provided as part of a single body 52 disposed on shaft 36 immediately inwardly of turbine wheel 28. Body 52 includes a disk 54 having a front surface 56 shaped to substantially conform to a rear surface 58 (FIG. 2) of turbine wheel 28, and a central aperture 60 by which disk 54 is mounted on shaft 36. Scallop fillers 50 are thicker areas disposed at the periphery of disk 54, and are precisely formed by machining, casting or the like to plug the openings created in turbine wheel 28 by scallops 40. Additionally, the front surface of each scallop filler 50 is formed to provide an aerodynamically smooth transition between adjacent turbine blades 38, in the areas of scallops 40. In this regard, each scallop filler 50 will have a surface configuration similar to that portion of turbine wheel 28 removed to form scallops 40. With scallop fillers 50 properly positioned in scallops 40, the surface presented to flow along turbine wheel 28 is substantially similar to the surface of a non-scalloped turbine wheel.

Compressor 24 includes an inlet 70 and a compressor outlet 72. Compressor inlet 70 receives combustion gas from a source such as ambient air, and compressor outlet 72 supplies compressed combustion gas to intake manifold 18 via a fluid conduit 74. It should be understood that compressor 24 is shown in schematic representation, and may include one or more compressor wheels providing one or more stages of compression. A suitable interstage duct, interstage cooler and the like may be provided in a turbocharger have multiple compressor wheels. An aftercooler 76 may be provided in conduit 74.

EGR system 12 includes a duct 78 receiving exhaust gas from first exhaust manifold 20, to direct the exhaust gas to intake manifold 18. Duct 78 includes a valve 80 for controlling the flow of exhaust gas through duct 78. An EGR cooler 82 may be provided in duct 78 to lower the temperature of exhaust gas provided to intake manifold 18.

Fluid conduit 74 and duct 78 are fluidly coupled to a mixer 84. Mixer 84 controls the mixture of compressed combustion gas from compressor 24 with exhaust gas recirculated from EGR system 12, providing a mixture thereof to intake manifold 18 through a fluid conduit 86.

Industrial Applicability,

During use of engine 10, a fuel, such as, for example, diesel fuel, is introduced into combustion cylinders 16 and combusted when a piston (not shown) disposed within each combustion cylinder 16 is at or near a top dead center position. Exhaust gas is transported from each combustion cylinder 16 to exhaust manifold 20. Some of the exhaust gas within exhaust manifold 20 is transported to conduit 34 and inlet 30, for rotatably driving turbine wheel 28. Turbine 22 in turn rotatable drives compressor 24 via shaft 36. The spent exhaust gas is discharged from turbine 22 to the ambient environment through turbine outlet 32.

The exhaust gas flow enters turbine 22 through inlet 30 near the outer diameter of turbine wheel 28, and flows inwardly along turbine blades 38 to turbine outlet 32. In the use of turbochargers having turbines with scalloped turbine wheels, the flow of exhaust gas is disrupted along the periphery of the turbine wheel, as the incoming gaseous stream encounters edge 42 defining scallops 40. Disrupted exhaust gas flow through turbine 22 decreases efficiency of the turbine. However, in the present invention, body 52 is positioned immediately adjacent turbine wheel 18 on shaft 36, and scallop fillers 50 plug the openings in the periphery of turbine wheel 28 defined by edge 42. Scallop fillers 50 create an aerodynamically smooth transition between adjacent turbine blades 38, with no significant edges that will disrupt flow along turbine blades 38. The undisrupted flow of exhaust gases through turbine 22 results in increased turbocharger efficiency.

Compressor 24, driven by turbine 22 via shaft 36, draws combustion air into compressor inlet 70. The combustion air is compressed within compressor 24 in known fashion, and is discharged from compressor 24 through compressor outlet 72 and fluid conduit 74. The compressed combustion air is cooled within aftercooler 76, and is transported to intake manifold 18 via mixer 84 and fluid conduit 86 for use in combustion occurring within combustion cylinders 14.

Exhaust gas is recirculated from exhaust manifold 20 to intake manifold 18 via EGR duct 78, mixer 84 and fluid conduit 86. Exhaust gas flow through EGR duct 78 is controlled by valve 80 and cooled by EGR cooler 82.

Mixer 84 combines fluid flow from EGR duct 78 and from fluid conduit 74, and supplies the mixture thereof to intake manifold 18 through fluid conduit 86.

The turbocharger of the present invention achieves the advantages of a scalloped turbine wheel while retaining the efficiency of a nonscalloped turbine wheel. Turbine wheel mass is reduced, to decrease stresses in the turbine wheel. Efficiency is retained by providing scallop fillers that are not part of the turbine wheel, and do not add to the mass thereof being provided as a separate part, but eliminate the disruption of gas flow along the turbine wheel surface.

Other aspects, objects and advantages of this invention can be obtained from a study of the drawings, the disclosure and the appended claims.

What is claimed is:

1. An internal combustion engine, comprising:

a plurality of combustion cylinders;

an exhaust manifold coupled with said plurality of combustion cylinders;

an intake manifold coupled with said plurality of combustion cylinders; and a turbocharger including a compressor having an inlet receiving combustion gas and an outlet in fluid flow communication with said intake manifold, and a turbine drivingly coupled to said compressor, said turbine having a turbine casing, a shaft rotatably disposed in said casing, a turbine wheel disposed on said shaft in said casing, said turbine wheel having a plurality of turbine blades and an edge defining a plurality of scallops, and scallop fillers disposed between said turbine blades, said scallop fillers unattached to said turbine wheel.

2. The internal combustion engine of claim 1, said scallop fillers attached to said shaft.

3. The internal combustion engine of claim 2, said scallop fillers defining a single body attached to said shaft.

4. The internal combustion engine of claim 3, said body including a disk adjacent said turbine wheel, and said fillers disposed at the periphery of said disk, said scallop fillers shaped to plug openings between adjacent turbine blades and having an outer surface aerodynamically shaped to transition between adjacent said turbine blades.

5. An internal combustion engine, comprising:

a plurality of combustion cylinders;

an exhaust manifold coupled with said plurality of combustion cylinders;

an intake manifold coupled with said plurality of combustion cylinders; and a turbocharger including a compressor having an inlet receiving combustion gas and an outlet in fluid flow communication with said intake manifold, and a turbine drivingly coupled to said compressor, said turbine having a turbine casing, a shaft rotatably disposed in said casing, a turbine wheel disposed on said shaft in said casing, said turbine wheel having a plurality of turbine blades and an edge defining a plurality of scallops, and scallop fillers disposed between said turbine blades, said scallop fillers defining a single body attached to said shaft.

6. An internal combustion engine, comprising:

a plurality of combustion cylinders;

an exhaust manifold coupled with said plurality of combustion cylinders;

an intake manifold coupled with said plurality of combustion cylinders; and a turbocharger including a compressor having an inlet receiving combustion gas and an outlet in fluid flow communication with said intake manifold, and a turbine drivingly coupled to said compressor, said turbine having a turbine casing, a shaft rotatably disposed in said casing, a turbine wheel disposed on said shaft in said casing, said turbine wheel having a plurality of turbine blades and an edge defining a plurality of scallops, and scallop fillers disposed between said turbine blades, including a disk adjacent said turbine wheel, and said scallop fillers disposed at the periphery of said disk, said scallop fillers shaped to plug openings between adjacent turbine blades and having an outer surface aerodynamically shaped to transition between adjacent said turbine blades.

7. A turbocharger, comprising:

a compressor having an inlet receiving combustion gas and an outlet; and a turbine drivingly coupled to said compressor, said turbine having a turbine casing, a shaft rotatably disposed in said casing, a turbine wheel disposed on said shaft in said casing, said turbine wheel having a plurality of turbine blades and an edge defining a plurality of scallops, and scallop fillers disposed between said turbine blades, said scallop fillers unattached to said turbine wheel.

8. The turbocharger of claim 7, including a disk provided on said shaft adjacent said turbine wheel, said disk carrying said scallop fillers thereon.

9. The turbocharger of claim 7, including a disk provided on said shaft adjacent said turbine wheel, said disk carrying said scallop fillers thereon.

10. The turbocharger of claim 9, said scallop fillers disposed at the periphery of said disk, said scallop fillers shaped to plug openings between adjacent turbine blades and having an outer surface aerodynamically shaped to transition between adjacent said blades.

11. The turbocharger of claim 7, said scallop fillers defining a single body attached to said shaft.

12. The turbocharger of claim 7, including a disk adjacent said turbine wheel, and said scallop fillers disposed at the periphery of said disk, said scallop fillers shaped to plug openings between adjacent turbine blades and having an outer surface aerodynamically shaped to transition between adjacent said blades.

13. A turbine comprising:

a turbine casing;

a shaft rotatably disposed in said casing;

a turbine wheel disposed on said shaft in said casing, said turbine wheel having a plurality of turbine blades and an edge defining a plurality of scallops; and a disk on said shaft adjacent said turbine wheel, said scallop fillers disposed at the periphery of said disk and between said turbine blades, said scallop fillers shaped to plug openings between adjacent said turbine blades and having an outer surface aerodynamically shaped to transition between adjacent said blades.

14. A method of operating an internal combustion engine, comprising the steps of:

providing a plurality of combustion cylinders, an exhaust manifold and an intake manifold;

transporting exhaust gas from said plurality of combustion cylinders to said exhaust manifold;

providing a turbocharger including a compressor having an inlet and an outlet, and a turbine having an inlet and an outlet, a turbine wheel, a plurality of turbine blades and scallops on an outer edge of said turbine wheel;

providing scallop fillers plugging said scallops, said scallop fillers connected to said shaft and unconnected to said turbine wheel;

rotatably driving said turbine with exhaust gas introduced at said turbine inlet, and flowing said exhaust gas along said turbine wheel and said scallop fillers to said turbine outlet;

introducing combustion gas at said compressor inlet; and transporting combustion gas from said compressor outlet to said intake manifold.

15. The method of claim 14, including the step of providing said scallop fillers as a single body.

16. The method of claim 15, including the steps of providing a disk adjacent said turbine wheel, providing said scallop fillers disposed at the periphery, of said disk, and shaping said scallop fillers to plug openings between adjacent turbine blades and to have an outer surface aerodynamically shaped to transition between adjacent said blades.

17. A turbine comprising:

a turbine casing;

a shaft rotatably disposed in said casing;

a turbine wheel disposed on said shaft in said casing, said turbine wheel having a plurality of turbine blades and an outer edge, said turbine wheel including scallops along said outer edge between said turbine blades; and means separate from and associated with said turbine wheel for improving aerodynamic efficiency of fluid flow along said turbine blades, said means including a disk disposed on said shaft adjacent said turbine wheel, and scallop fillers disposed in said scallops.

* * * * *